United States Patent [19]

Land

[11] 4,292,061
[45] Sep. 29, 1981

[54] AIR CLEANER FOR FUEL INJECTED ENGINES

[76] Inventor: Charles M. Land, 14 Valencia, Apt. 5, San Rafael, Calif. 94901

[21] Appl. No.: 143,945

[22] Filed: Apr. 25, 1980

[51] Int. Cl.³ .............................................. B01D 46/40
[52] U.S. Cl. ........................................ 55/493; 55/499; 55/500; 55/501; 55/502; 55/529
[58] Field of Search ...................... 55/385 B, 491, 493, 55/499, 500, 501, 502, 505, 529, DIG. 13, 507; 210/452, 454, 460

[56] References Cited

U.S. PATENT DOCUMENTS

| | | | |
|---|---|---|---|
| 2,731,104 | 1/1956 | Baker et al. | 55/502 |
| 2,771,963 | 11/1956 | Eichorn | 55/491 |
| 2,847,085 | 8/1958 | Ehlers | 55/493 |
| 3,385,039 | 5/1968 | Burke et al. | 55/501 |
| 3,552,103 | 1/1971 | Smith | 55/507 |
| 3,810,350 | 5/1974 | Scholl | 55/500 |
| 4,082,525 | 4/1978 | Allan | 55/502 |

FOREIGN PATENT DOCUMENTS

| | | | |
|---|---|---|---|
| 1052479 | 1/1954 | France | 55/493 |
| 936777 | 9/1963 | United Kingdom | 55/DIG. 13 |

*Primary Examiner*—David L. Lacey
*Attorney, Agent, or Firm*—Owen, Wickersham & Erickson

[57] ABSTRACT

An air filter assembly for a fuel-injected engine of the rectangular air inlet type typical of some imported automobiles is secured directly to the filter seat flange of the air intake opening of the engine, without a separate housing or canister. The filtering element is of a soft, porous foam material backed by a wire mesh of relatively large mesh size, and a collar at the base of the filter assembly is secured to both the filtering element and the backing mesh to hold the assembly together and in the proper configuration. Backing may be included on both the inner and the outer sides of the filtering element, sandwiched between inner and outer bands or flanges of the collar, with fasteners extending between the bands to pull them together and hold the filtering element and backing in the collar. The filtering element and backing are formed into an outwardly bulging, generally arcuate configuration for optimizing filtering area. A gasket is secured to the underside of the collar in position to engage the filter seat flange of the engine's air intake, and a series of over-center type pivot spring fasteners are secured to the outer side of the collar for engaging the air intake filter seat flange and holding the air filter assembly tightly in place.

4 Claims, 3 Drawing Figures

U.S. Patent    Sep. 29, 1981    4,292,061
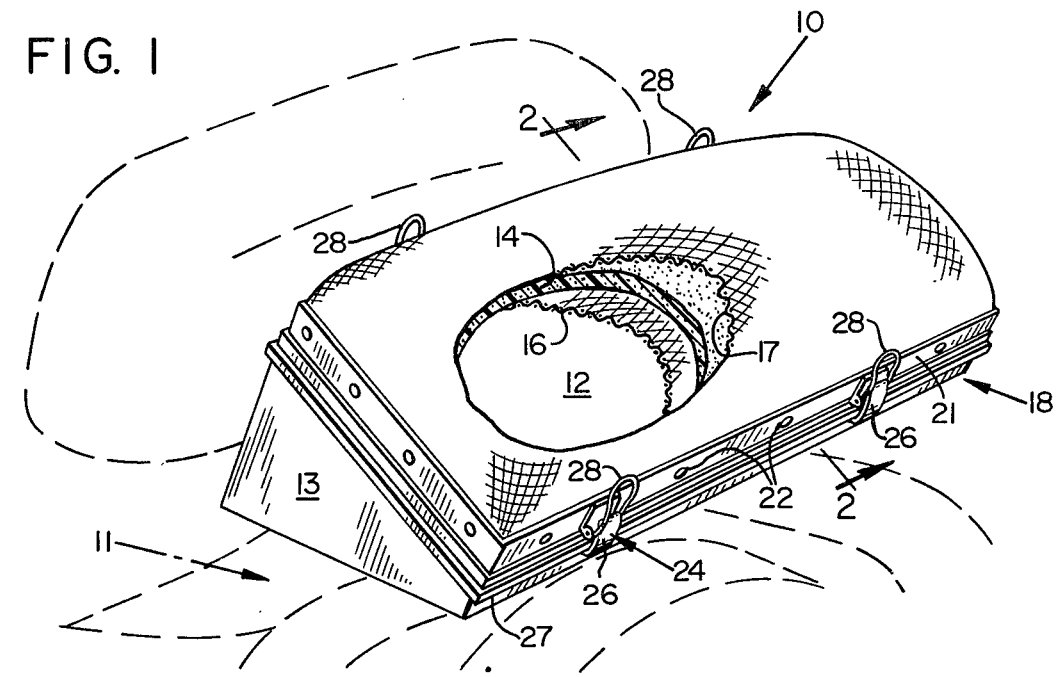
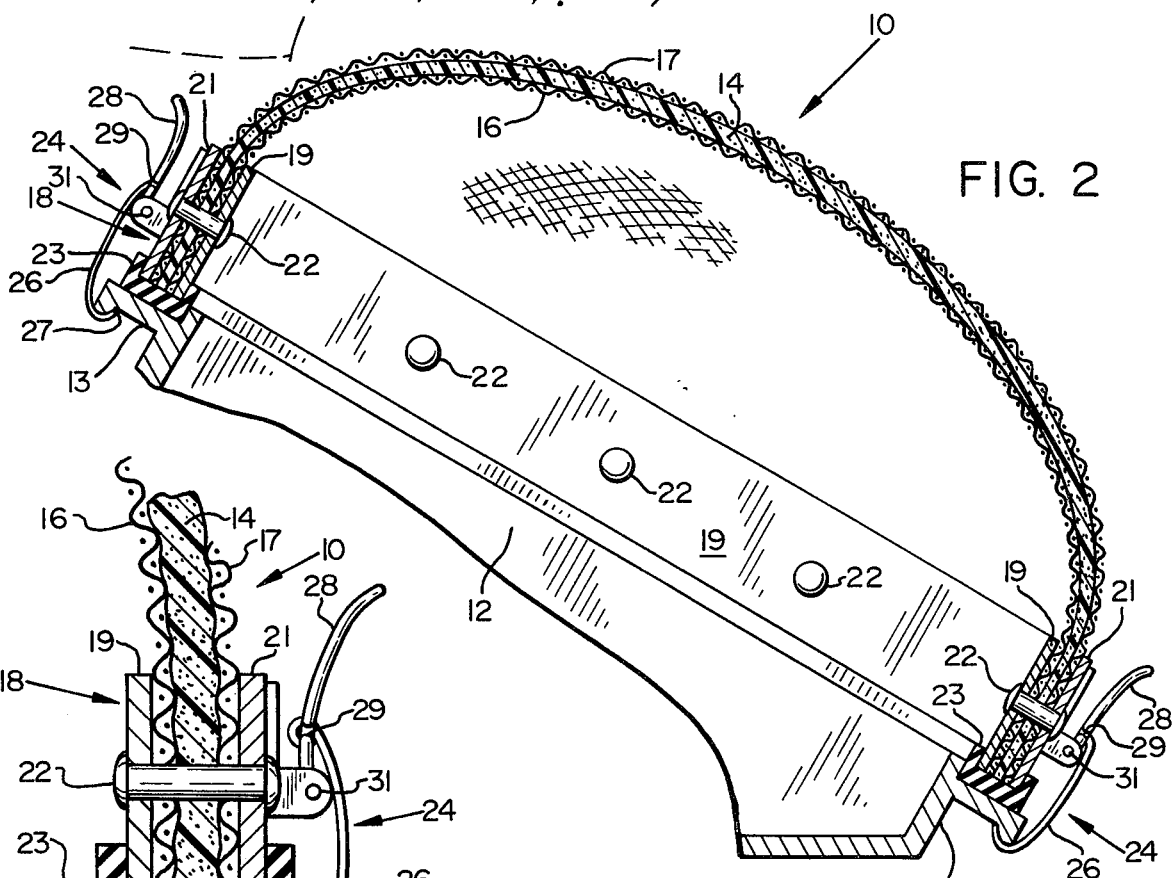

AIR CLEANER FOR FUEL INJECTED ENGINES

BACKGROUND OF THE INVENTION

The invention relates to air filters for automotive engines, and more particularly to an improved, self-contained air filter assembly for a fuel injected engine, eliminating the need for a canister or housing as has typically been used on such engines.

In fuel injected engines, filtration of ingested air must be very complete in order to avoid interference of even very small particles with the relatively sophisticated and fine-tuned components of the injection system. Generally, fuel injected systems as incorporated on many high-performance European cars have included a rectangular air intake opening with a canister type air filter assembly connected to the opening and a cartridge type replaceable air filter unit inside the canister. The canisters have usually included a relatively small horn-shaped opening through which all the intake air must pass as it enters the canister for distribution around the surfaces of the filtering element inside. This type of assembly has been expensive to produce and to maintain, and has resulted in sometimes serious restrictions of the air supply to the engine, due to the narrowness of the air filter housing opening, the flow paths required for entry into the filter element, and the type of filter element employed, usually porous paper. The disposable filter element had to be changed quite frequently and even the filter housing, which sometimes was of plastic, usually required periodic replacement because of permanent deformation due to engine heat. The deformed housing would no longer seal against the intake opening, and unfiltered air would be admitted to the engine. On some automobiles, elastic bands were used to hold the filter housing in place on the filter seat, connected to projections on the sides of the filter seat, and these bands would frequently fail.

There have been marketed several replacement air filters, particularly for carbureted engines, comprised of cleanable foam material supported by appropriate air-permeable retaining structure, with no external housing or canister needed. These filters have generally reduced air resistance into the engine and have sometimes been claimed to improve performance on carbureted engines.

However, there has been a need for a simpler, more economically produced air filter assembly for highly tuned fuel injected engines, which does not unduly restrict airflow and which is quickly and easily mounted on and removed from the air intake filter seat and capable of cleaning and re-use.

SUMMARY OF THE INVENTION

The present invention provides an air filter assembly which meets the aforesaid needs and performs in a superior manner in every respect. The filter is self-contained, without the need for a separate canister or housing to contain the filter element. The element is simply connected to a base or collar member having a gasket at its underside, and this assembly is clipped securely onto the rectangular filter seat flange of the fuel injected engine by means of overcenter type pivot spring fasteners positioned around the periphery of the filter assembly collar, engageable with the seat flange on the engine. The filter element is of a soft, porous foam material, and structural backing is provided, preferably on both sides, to hold the element in an outwardly bowed, generally arcuate configuration for maximizing air flow and filtering capacity.

Thus, an air filter according to the present invention, for a fuel injected engine having a generally rectangular opening for air intake and a filter seat flange surrounding the opening has a rigid, generally rectangular collar forming a base for the filter and a filtering element of porous foam material secured to and extending from side to side and end to end on the rigid collar. The element extends outwardly in a generally arcuate configuration between the sides of the collar, according to a preferred ratio between the approximate inner side radius of the element and the inner width of the element at the collar, or in accordance with an approximate circular arc as a preferred portion of a circle. An air-passing structural backing is provided on at least the inner side of the filtering element, secured to the collar for supporting the filtering element in the generally arcuate shape. On the bottom of the collar is a generally rectangular gasket in position to engage the filter seat flange of the engine, and the assembly includes a means for securing the collar to the filter seat flange to tightly seal the filter assembly to the air intake opening.

The rigid collar of the air filter assembly preferably is of aluminum, with the filtering element and structural backing secured together and to the collar by fasteners such as rivets. The backing may be a mesh provided at both the inner side and the outer side of the filtering element, with the layers of mesh and foam filtering element sandwiched between inner and outer bands of the rigid collar.

A filter assembly constructed according to these principles is inexpensive yet rugged, secure in its retention to the engine and capable of increasing engine efficiency by reducing air flow resistance into the engine without sacrificing throughness of air filtration. The filter assembly may be cleaned periodically and re-used, lasting virtually indefinitely, and with quick and simple removal and re-attachment of the assembly to the air intake structure.

These and other objects, advantages and features of the invention will be apparent from the following description of a preferred embodiment, presented in conjunction with the accompanying drawings.

DESCRIPTION OF THE DRAWINGS

FIG. 1 is a perspective view of an air filter assembly according to the invention, illustrated in conjunction with a fuel injected automotive engine.

FIG. 2 is a sectional view of the air filter assembly, taken along the line 2—2 of FIG. 1.

FIG. 3 is an enlarged detailed view in section, showing one side of the air filter at the base, and its manner of connection to the engine's air intake structure.

DESCRIPTION OF A PREFERRED EMBODIMENT

In the drawings, FIG. 1 shows an air filter assembly 10 according to the invention, particularly for use with fuel injected engines such as the engine 11 a portion of which is indicated in the figure. The engine 11 is of the type that includes a generally rectangular opening 12 for air intake, with a filter seat flange 13 surrounding the opening and providing a seat usually intended for a conventional canister type air filter housing within which is contained a disposable cartridge type filter element (not shown). The filter unit 10 has a filtering element 14 of a soft, porous foam material, formed into an outwardly bowing, generally arcuate configuration as illustrated. It has been found that a reticulated foam, preferably of polyurethane, of the type sold under part No. SIS-Z-65-PPI by Scott Paper Co., Foam Division, having a pore size of about 65 in the porosity grade and about 19 to 25 mm thickness provides thorough air filtration, even of the finest particles, without undue hindrance of the air flow. This material is readily cleanable by passing water or gasoline or other suitable solvent in the reverse direction through the element 14.

The filtering element 14, as shown in FIGS. 1 and 2, is supported by a structural backing 16, provided at least against the inner side of the element 14. This backing 16, which may be of a corrosion-resistant wire mesh material having a typical smaller opening dimension of about 1.5 mm, holds the foam filtering element 14 in the desired generally arcuate configuration. An outer backing 17 is preferably also provided, to protect the filtering element and further to help retain its shape, and this backing 17 may be of the same material as the backing 16.

A rigid, generally rectangular collar or frame 18 provides support and rigidity for the filter assembly 10. This collar preferably comprises inner and outer relatively rigid bands 19 and 21, spaced apart with the filtering element 14 and structural backing 16 and 17 sandwiched between the bands as indicated. Rivets 22, screws or other suitable fasteners draw the two bands 18 and 21 toward one another to tightly retain the filter element and backing in the collar 18. The collar may be of aluminum or any other relatively rigid, heat-resistant shape-retaining material.

As shown in FIG. 2 and particularly in FIG. 3, the collar or frame 18 supports a resilient gasket 23 for sealing the assembly 10 against the filter seat flange 13 of the engine's air intake opening 12. The gasket 23 may be of any conventional elastomeric material as is commonly used for automotive gaskets, such as a neoprene rubber. It may be secured to the collar 18 by adhesion or suitable mechanical attachment which will not interrupt the continuous seal around the rectangular periphery of the air intake opening 12. It is preferably U-shaped as indicated, to slip over the collar for better attachment thereto.

FIG. 3 also illustrates a means of securing the collar 18 and air filter assembly 10 to the filter seat flange 13 of the engine, which may comprise over-center type pivot spring fasteners 24. At least two of these fasteners may be provided, on opposite sides of the collar 18, secured to the outer collar band 21 by one of the fasteners 22 as indicated. A spring clip 26 of the fastener 24 is positioned to engage a projection 27 of the engine's filter seat flange 13, as typically provided for securing of the original-equipment canister type air filter housing usually included in the as-manufactured vehicle. The over-center fastener 24 has a thumb lever 28 which pivots about a point 19 and in turn is pivotally connected to the spring clip 26 about a pivot point 31 located so as to provide the over-center function which, as is well known, holds the fastener in the latched position until the lever 28 is deliberately pulled back over-center. Other suitable fasteners or latches may be employed to hold the filter assembly 10 on the engine, and in some cases simple tension springs (not shown) secured to the outer collar band and having hooked lower ends for engine engagement may be preferable because of space limitations. Preferably four fasteners are included, depending upon the number and location of projections 27 or other similar engageable structures included on the engine's air filter seat structure 13.

The bowed or arched construction of the filtering element 14 is an important feature of the invention. It provides a greater filtering surface area than would result from a flat element, and one which faces in multiple directions for more efficient air flow through the element. If the element 14 is arched too high, i.e., too far outwardly from the rigid collar 18, the increased benefits of air flow diminish, and the filter construction becomes bulky, flimsy and impractical. It has been found that an optimum shape for the filtering element, for most fuel injected engines having a rectangular air intake opening, is generally arcuate in transverse cross-section with the approximate arc center located at or below the plane of the top of the rigid collar 18. For an engine air intake opening having a width (narrower dimension) of about 100 millimeters, the approximate inner side filter element radius should be between about 50 millimeters and about 100 millimeters, for the side-to-side smaller dimension of the rectangle. For an engine air intake opening width of about 500 millimeters, the approximate inner side filter element radius should be between about 250 millimeters and about 500 millimeters. In general, the inner side radius of the approximately arcuate element should be a multiple of between about 0.5 and about 1.0 times the inner width of the element at the collar. This translates to an approximate arc of between about 180° and about 60°, from one side (narrower dimension) to the other where the element meets the collar. Preferably, the above radius-to-width ratio is within the narrower range of about 0.52 to 0.8, representing an arc range of about 158° to 77°.

As an example, in a filter according to the invention for use with an engine having a rectangular air inlet with a width of about 160 mm, the arched filter element would preferably have an arc angle of about 142°, and approximate radius of 84 mm, and an inner side height above the top of the collar 18 of about 57 mm. This is a radius-to-width ratio of about 0.525.

Reduced air flow resistance is an important feature of the invention, and it has been found that on many fuel injected engines, efficiency is actually increased with the reduced air resistance filter of the present invention, and engine temperature on an air-cooled engine can be significantly and beneficially reduced also. Because of the greater air intake, a leaner mixture results, producing a lower output of carbon monoxide and hydrocarbons into the atmosphere. Normally, by leaning the mixture, the engine runs at hotter temperatures, creating more NOX emissions (oxides of nitrogen). But the increased air intake from the filter of the invention lowers engine temperature rather than raising it. This lowers NOX emission and increases the life of an air-cooled engine. An optimum value of air flow resistance provided by the filtering element 14 and attached structural backing 16 and/or 17, for most fuel injected engines, has been found to be about 0.15 inch of water (in.$H_2O$) at 200 feet per minute air flow, about 0.45 in. $H_2O$ at 400 feet per minute, and about 1.32 in. $H_2O$ at 800 feet per minute.

It should be understood that as used herein and in the appended claims, relative positional terms such as "above" and "below" merely refer to the filter assembly 10 as shown in the drawings, particularly FIG. 2. In many engines the air intake opening is at an oblique angle, nearly horizontal, and such positional terms are not intended to refer to the filter assembly in this installed position.

To those skilled in the art, various changes in construction and modified embodiments and applications of the invention will be apparent without departing from the essence and scope of the invention. The described embodiments are illustrative of the principles of the invention but are not intended to be in any sense limiting.

I claim:

1. An air filter for a fuel injected engine having a generally rectangular opening for air intake and a filter seat flange surrounding the opening, comprising:

a rigid generally rectangular collar forming a base for the filter;

a filtering element of soft, porous foam material secured to and extending from side to side and end to end on the rigid collar, the element extending outwardly in a generally arcuate configuration between the sides of the collar, with an approximate inner side radius of between about 0.5 and about 1.0 times the inner width of the element at the collar;

an air passing structural backing for the filtering element in the same generally arcuate shape, secured to the collar and included at both the inner side and the outer side of the filtering element, the collar comprising spaced inner and outer bands, with the filtering element and two layers of backing extending into the collar between the bands, and fasteners passing through the bands and retaining the filter element and backing together and to the collar;

a generally rectangular gasket secured to the collar in position to engage the filter seat flange; and means for securing the collar to the filter seat flange of the engine.

2. The air filter of claim 1, wherein the foam material of the filtering element is reticulated polyurethane and the air-passing structural backing is of a corrosion-resistant metal mesh having an opening dimension of about 1.5 millimeters.

3. The air filter of claim 2, wherein the foam material of the filtering element has a pore size of about 65.

4. The air filter of claim 2, wherein the filtering element and the structural backing have an air flow resistance of about 0.15 in. $H_2O$ at 200 feet per minute and about 0.45 in $H_2O$ at 400 fpm.

* * * * *